(12) United States Patent
Li

(10) Patent No.: US 9,454,003 B1
(45) Date of Patent: Sep. 27, 2016

(54) LENSE MODULE

(71) Applicant: Texas Instruments Incorporated, Dallas, TX (US)

(72) Inventor: Yunhong Li, Santa Clara, CA (US)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 0 days.

(21) Appl. No.: 14/871,750

(22) Filed: Sep. 30, 2015

(51) Int. Cl.
*G02B 27/00* (2006.01)
*G02B 7/00* (2006.01)
*G02B 7/02* (2006.01)

(52) U.S. Cl.
CPC ........... *G02B 27/0006* (2013.01); *G02B 7/021* (2013.01); *G02B 7/026* (2013.01)

(58) Field of Classification Search
CPC ................................................ G02B 27/0006
See application file for complete search history.

(56) References Cited

U.S. PATENT DOCUMENTS

| 2012/0243093 A1* | 9/2012 | Tonar | G02B 27/0006 359/507 |
| 2014/0033454 A1* | 2/2014 | Koops | G02B 27/0006 15/94 |
| 2014/0036084 A1* | 2/2014 | Lu | B60R 11/04 348/148 |

OTHER PUBLICATIONS

Li, Yunhong; Ma, Wei; U.S. Appl. No. 14/799,309, filed Jul. 14, 2015, for "Ultrasound Lens Cleaner Driver With Frequency Selectable Oscillator," 24 pages.

* cited by examiner

*Primary Examiner* — W B Perkey
(74) *Attorney, Agent, or Firm* — John R. Pessetto; Frank D. Cimino

(57) ABSTRACT

A lens assembly includes a first lens and a transducer attached to the first lens. A method of cleaning a lens includes vibrating the lens with a transducer attached to the lens. A method of making a lens assembly includes mounting a first lens above a second lens and attaching a transducer to the first lens.

14 Claims, 3 Drawing Sheets

| 210 | VIBRATING THE LENS WITH A TRANSDUCER ATTACHED TO THE LENS |

| 220 | MOUNTING A FIRST LENS ABOVE A SECOND LENS |
| 222 | ATTACHING A TRANSDUCER TO THE FIRST LENS |

LENSE MODULE

The quality of an image produced by a camera is dependent upon the cleanliness of the camera lens. Even the most accurate and expensive camera cannot produce quality images if the lens is covered with contaminants such as mud and dirt. For cameras operated in harsh environments lens cleaning is often difficult and/or inconvenient. For example a vehicle rear view camera is constantly exposed to road dirt and other contaminants. Cleaning of a vehicle rear-view lens, particularly during vehicle movement, is extremely difficult. As a result, the image quality from a vehicle rear-view camera is often poor.

SUMMARY

A lens assembly includes a first lens and a transducer attached to the first lens. A method of cleaning a lens includes vibrating the lens with a transducer attached to the lens. A method of making a lens assembly includes mounting a first lens above a second lens; and attaching a transducer to the first lens.

DETAILED DESCRIPTION

Figure 1:
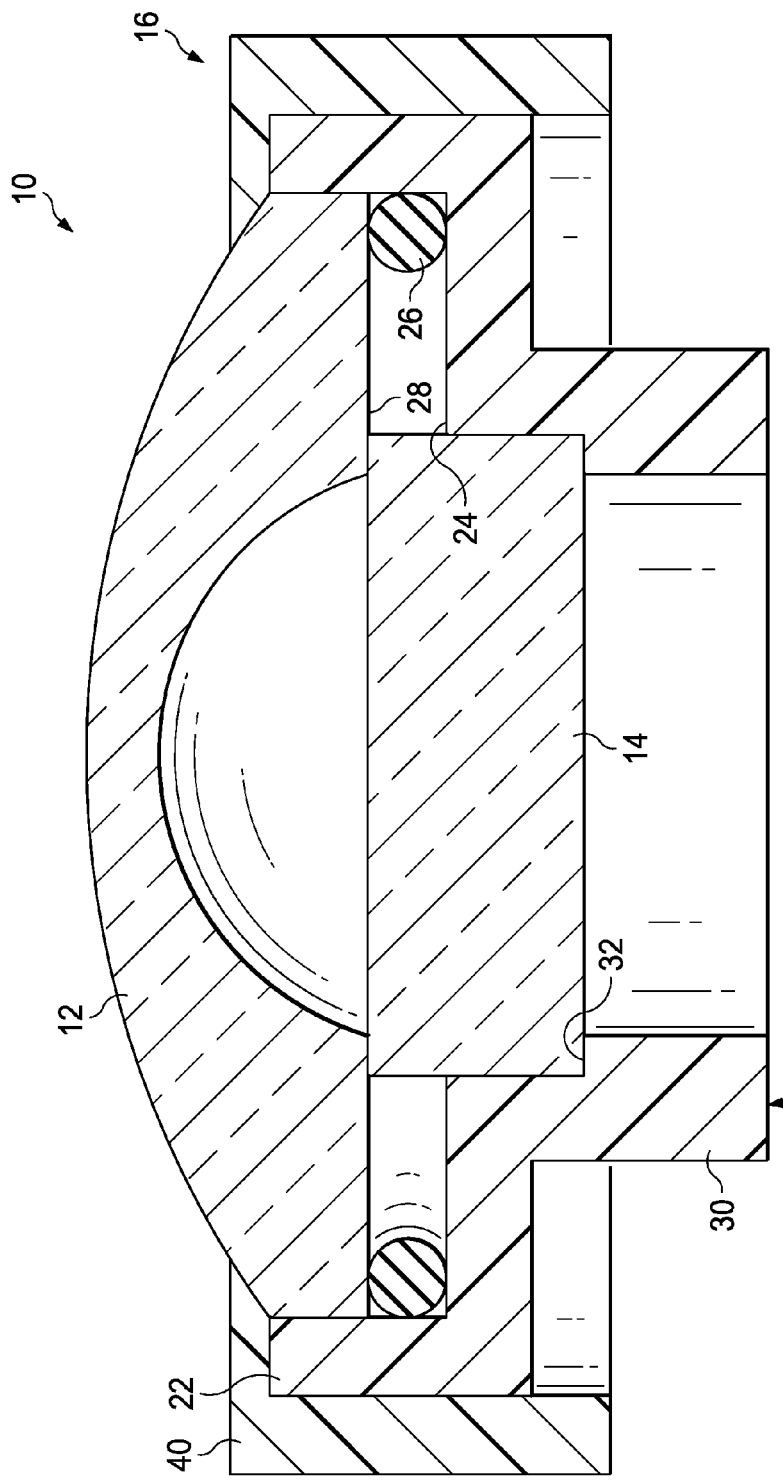
FIG. 1 is a schematic cross-sectional view of a prior art lens assembly.

FIG. 1 schematically illustrates a conventional fisheye lens module 10 for an automobile rear view camera. The module 10 includes a first lens 12 and a second lens 14 mounted in a lens support structure 16. The top surface of the second lens 14 engages the bottom surface of the first lens 12.

The lens support structure 16 includes a tubular member 20 having a relatively large diameter portion 22. The relatively large diameter portion 22 has an annular radially extending surface 24. A ring member or O-ring 26 rests on surface 24. A bottom radially extending surface 28 of the first lens 12 is supported by the O-ring 26. Tubular member 20 also includes a relatively smaller diameter portion 30. An annular shoulder 32 of the smaller diameter portion 30 supports the second lens 14.

The lens support structure 16 also includes a lens cap 40 that is attached, as by adhesive, to the tubular member 20. The lens cap 40 holds the first lens 12 in a fixed position within the tubular member 20. The first and second lenses 12, 14 are thus held in a fixed relationship by the lens support structure 16 and the O-ring 26.

Figure 2:
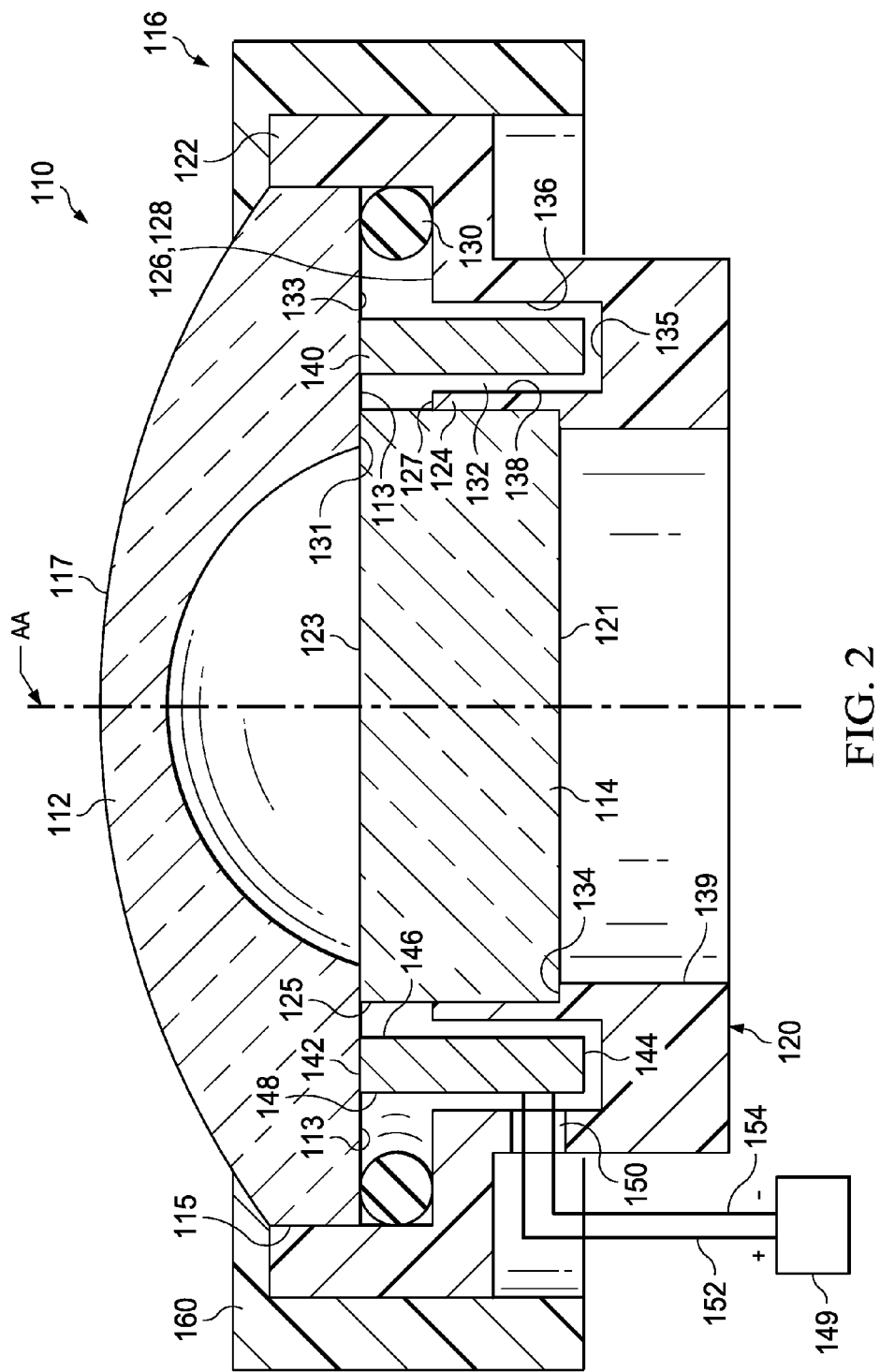
FIG. 2 is a schematic cross-sectional view of an example embodiment of a lens assembly.

FIG. 2 is a schematic cross-sectional view of an example embodiment of a lens module 110. The lens module 110 includes a first lens 112 and a second lens 114 having coaxial central longitudinal axes AA. The first lens 112 has a radially extending bottom surface 113, an axially extending annular surface 115 and a convex top surface 117. The second lens 114 has a flat bottom surface 121, a flat top surface 123 and an annular outer wall surface 125 connecting the top and bottom surfaces 121 and 123. The bottom surface 113 of the first lens 112 engages the top surface 123 of the second lens 114.

The lenses 112 and 114 are held in a fixed relationship by a lens support structure 116. The lens support structure 116 includes a tubular member 120. The tubular member 120 has a relatively larger internal diameter top portion 122 and a relatively smaller internal diameter bottom portion 124. A radially extending transition portion 126 connects the top and bottom portions 122, 124. The transition portion 126 has a radially extending top surface 128 that supports an O-ring 130.

An annular cavity or channel 132 extends axially downwardly from an upper surface 127 of the relatively small diameter portion 124, which in the illustrated embodiment, is an extension of the transition portion top surface 128. The channel 132 has an annular, axially extending outer wall 136, an annular, axially extending inner wall 138 and a radially extending bottom wall 135.

An annular shoulder 134 is formed on an interior wall of the relatively small diameter bottom portion 124 of the tubular member 120. The annular shoulder 134 engages and supports the second lens 114 at the bottom surface 121 thereof. The axial portion of the annular shoulder, the axial dimension of the second lens 114, the axial position of the surface 128 and the axial height of the O-ring 130 are selected such that the first lens 112 has a radially inner portion 131 thereof supported by the second lens 114 and a radially outer portion 133 thereof supported by the O-ring 130 at the same axial height as the radially inner portion 131.

A tubular piezoelectric transducer 140 has radially extending top and bottom surfaces 142, 144 and cylindrical, inner and outer axially extending surfaces 146, 148. The top surface 142 of the piezoelectric transducer 140 is connected to the bottom surface 113 of the first lens 112 as by adhesive. The axial length of the tubular piezoelectric transducer 140 is sufficiently short so that the bottom surface 144 thereof does not contact the bottom wall 135 of the channel 132. The shape and wall thickness of the tubular piezoelectric transducer 140 are such that the transducer 140 does not come into contact with the outer wall 136 or inner wall 138 of the channel 140. Thus, when the transducer 140 vibrates, its vibration is directly transmitted only to the first lens 112. The transducer 140 receives electrical energy from leads 152, 154, which are attached to a power source and, which extend into the channel 132 as through a hole 150 in the outer wall 136. A lens cap 160 may be attached to the tubular member 120 to prevent axial displacement of the first lens 112 relative to the support structure 116.

The use of ultrasonic vibration to clean optical components such as camera lenses and contact lenses is known in the art. A typical prior art optical ultrasonic cleaner has a chamber containing a fluid that readily conducts ultrasonic vibration. The optical component to be cleaned is placed in this chamber and the fluid in the chamber is subjected to ultrasonic vibration produced by a transducer in the chamber. The vibration produces tiny bubbles in the fluid that contact the lens surface engaging and removing foreign materials such as dirt and the like.

Figures 3, 4, 5:
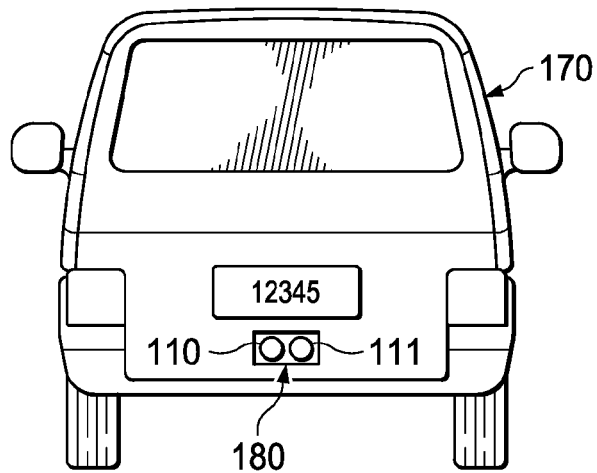
FIG. 3 is a schematic rear elevation view of an example embodiment of a vehicle with a rear-view camera incorporating the lens assembly of FIG. 2.
FIG. 4 is a flow chart of an example embodiment of a method of cleaning a lens.
FIG. 5 is a flow chart of an example embodiment of a method of making a lens assembly.

FIG. 3 illustrates an example embodiment of an automobile 170 having a rear view camera 180 with the lens module 110 illustrated in FIG. 2. A reservoir of lens cleaning fluid within the automobile communicates with a spray nozzle 111 that may be provided adjacent to the lens module 110 to spray cleaning fluid on the lens 112 just prior to or during vibration of the lens by the piezoelectric transducer 140.

Alternatively cleaning fluid may be sprayed on the lens 112 manually from a spray bottle held by a user before the transducer is manually actuated by a control surface inside the automobile 170. The exterior environment itself may produce cleaning fluid, for example rainwater, which transmits sufficient ultrasonic energy to the lens to clean it. In some embodiments, no fluid is applied to the lens, and vibration of the lens by the transducer 140 alone removes contaminants form the lens.

The vibration frequency of the transducer 140 is selected to provide optimal vibration cleaning of the first lens 112. For example a vibration rate in the range of about 20 k-1 MHZ may be selected for a lens 112 made from glass and having a lens diameter of about 15 mm.

As illustrated by FIG. 4, an example embodiment of a method of cleaning a lens may include, as illustrated at block 210, vibrating the lens with a transducer attached to the lens.

As illustrated by FIG. 5, an example embodiment of a method of making a lens assembly may include, as illustrated at block 220, mounting a first lens above a second lens and, as illustrated at block 222, attaching a transducer to the first lens.

Although certain specific embodiments of a lens assembly with an attached cleaning transducer and associated methods of making and using the lens assembly have been expressly described in detail herein, it will become apparent to those skilled in the art, after reading this disclosure, that the lens assembly and associated methods may be variously otherwise embodied. It is intended that the language of the appended claims be construed broadly so as to encompass such alternative embodiments, except as limited by the prior art.

What is claimed is:

1. A lens assembly comprising:
a first lens with an annular wall having an outer diameter, a first end and a second end;
a second lens adjacent to said first lens, said second lens having an outer diameter, a first end and a second end, wherein said transducer inner diameter is larger than said second lens outer diameter; and
a piezoelectric transducer attached to said first lens;
wherein said transducer comprises a tubular member with a first end attached to said first lens, a second end, an inner annular wall having an inner diameter and an outer annular wall having an outer diameter.

2. The lens assembly of claim 1 wherein said transducer outer diameter is smaller than said first lens outer diameter.

3. The lens assembly of claim 2 wherein said first end of said second lens is attached to said second end of said first lens.

4. The lens assembly of claim 1 further comprising a lens support structure comprising a first tubular portion having an annular inner wall engaging said annular outer wall of said first lens.

5. The lens assembly of claim 4, said lens support structure comprising a second tubular portion having an annular inner wall engaging an annular outer wall of said second lens and having an annular outer wall.

6. The lens assembly of claim 5:
said lens support structure comprising a radially extending portion connecting said first tubular portion to said second tubular portion; and
said lens assembly further comprising a lens support member positioned on said radially extending portion and engaging said second end of said first lens.

7. The lens assembly of claim 6, said second tubular portion comprising an annular cavity therein and wherein said tubular transducer is positioned at least partially within said annular cavity of said second tubular portion.

8. The lens assembly of claim 6, said sealing member comprising an O-ring.

9. The lens assembly of claim 7 further comprising at least one electrical lead attached to said transducer and extending through a bore in said second tubular portion of said lens support structure.

10. The lens assembly of claim 7 wherein said transducer touches only said first lens.

11. A method of making a lens assembly comprising:
mounting a first lens above a second lens; and
attaching a transducer to the first lens.

12. The method of claim 11 wherein said attaching a transducer comprises attaching a tubular transducer to a bottom surface of the first lens and encompassing the second lens with the tubular transducer.

13. The method of claim 11 wherein said attaching a transducer comprises suspending the transducer from the first lens in non-engaging contact with any other structure.

14. The method of claim 11 wherein said mounting comprises supporting the second lens on one tubular portion of a support structure and supporting the first lens on an O-ring positioned within another tubular portion of the support structure.

* * * * *